US012627657B2

(12) United States Patent　　　　(10) Patent No.:　US 12,627,657 B2
Kring et al.　　　　　　　　　　　(45) Date of Patent:　　May 12, 2026

(54) COMPUTERIZED SYSTEM AND METHOD FOR DEVICE-BASED IDENTITY MANAGEMENT

(71) Applicant: PLUME DESIGN, INC., Palo Alto, CA (US)

(72) Inventors: Charles Kring, Sunnyvale, CA (US); Austen Martin, West Kelowna (CA)

(73) Assignee: PLUME DESIGN, INC., Palo Alto, CA (US)

( * ) Notice: Subject to any disclaimer, the term of this patent is extended or adjusted under 35 U.S.C. 154(b) by 203 days.

(21) Appl. No.: 18/360,093

(22) Filed: Jul. 27, 2023

(65) Prior Publication Data

US 2025/0039171 A1　　Jan. 30, 2025

(51) Int. Cl.
　　*H04L 29/06*　　　(2006.01)
　　*H04L 9/40*　　　(2022.01)
(52) U.S. Cl.
　　CPC ...... *H04L 63/0861* (2013.01); *H04L 63/0807* (2013.01); *H04L 63/083* (2013.01); *H04L 63/10* (2013.01)
(58) Field of Classification Search
　　CPC . H04L 63/10; H04L 63/0807; H04L 63/0861; H04L 63/083; H04L 63/0853
　　See application file for complete search history.

(56) References Cited

U.S. PATENT DOCUMENTS 11,405,189 B1 * 8/2022 Bennison ............. H04L 9/3213
2016/0191511 A1 6/2016 Tijerina et al.

2017/0068956 A1 3/2017 Jones
2021/0211288 A1 7/2021 Yarabolu
2021/0358251 A1 * 11/2021 Maclean ............... H04L 9/3273
2023/0143293 A1 5/2023 Sanchez
2024/0223549 A1 * 7/2024 Yarabolu ............. H04L 63/0861

OTHER PUBLICATIONS

International Search Report and Written Opinion issued in corresponding Int'l Appln. No. PCT/US24/38148 mailed Oct. 21, 2024 (12 pages).

* cited by examiner

*Primary Examiner* — Tri M Tran
(74) *Attorney, Agent, or Firm* — Nicholas Martin; Greenberg Traurig, LLP

(57) ABSTRACT

Disclosed are systems and methods that provide a novel cross-session authentication framework that enables secure local and/or network sessions to be effectuated via biometric tracking via a wearable device (e.g., smart ring). In some implementations, when a user wearing a smart ring is authenticated with a first secure resource (e.g., a computer system such as a smart phone application associated with the smart ring), such authentication can be maintained and leveraged to access other resources that are separately being securely held. The smart ring, when properly worn, can monitor biometrics (e.g., vital signs) of a user, and based therefrom, determine if and/or when the smart ring is removed/manipulated from the user's finder. Until the smart ring is removed, the smart ring's confirmation of being worn by the user can be leveraged as an identification token that can enable the user access to other securely held information.

20 Claims, 6 Drawing Sheets

<u>300</u>

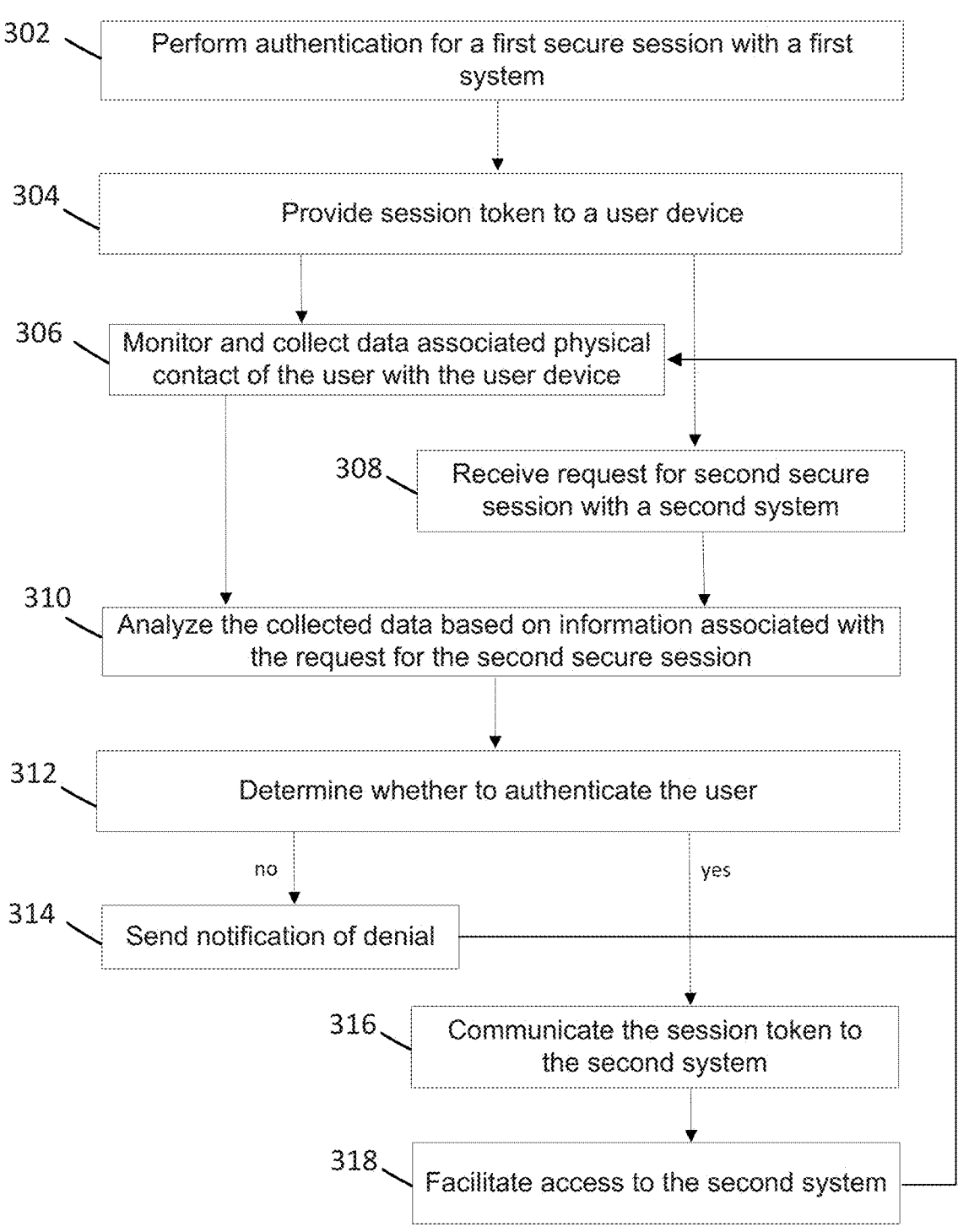

302 — Perform authentication for a first secure session with a first system

304 — Provide session token to a user device

306 — Monitor and collect data associated physical contact of the user with the user device 308 — Receive request for second secure session with a second system 310 — Analyze the collected data based on information associated with the request for the second secure session 312 — Determine whether to authenticate the user no yes 314 — Send notification of denial 316 — Communicate the session token to the second system 318 — Facilitate access to the second system

FIG. 3

COMPUTERIZED SYSTEM AND METHOD FOR DEVICE-BASED IDENTITY MANAGEMENT

FIELD OF THE DISCLOSURE

The present disclosure is generally related to identity monitoring and management, and more particularly, to a decision intelligence (DI)-based computerized framework for automatically and dynamically managing the identity and authenticated activities of a user via a wearable device associated with the user.

BACKGROUND

Currently, mechanisms for accessing securely held resources are limited to user provided input, which can include, for example, a username/password, PINs, facial recognition, fingerprints, and the like. Indeed, at most, two-factor authentication (2FA) or multi-factor authentication (MFA) can involve a combination of authentication types which can provide added layers of protection.

SUMMARY OF THE DISCLOSURE

However, such techniques are still susceptible to malicious activity. That is, for example, passwords can be hacked, facial recognition systems can be spoofed, and regardless of the number of MFA layers, each layer can be readily exposed via a data breach.

To that end, according to some embodiments, as discussed herein, the disclosed systems and methods provide a cross-session authentication framework that enables secure local and/or network sessions to be effectuated via biometric tracking via a wearable device. According to some embodiments, when a user wearing a smart ring is authenticated with a first secure resource (e.g., a computer system such as a smart phone application associated with the smart ring, for example), such authentication can be maintained and leveraged to access other (or third party) resources that are separately being securely held. According to some embodiments, a smart ring, when properly worn, can monitor biometrics (e.g., vital signs) of a user, and based therefrom, determine if and/or when the smart ring is removed from the user's finder (e.g., or manipulated out of place from being worn correctly). Until the smart ring is removed (and/or according to other related criteria, for example, a time period, type of gesture, requested resource, type of user, and the like), the smart ring's confirmation of being worn by the user can be leveraged as an identification token that can enable the user access to other securely held information.

According to some embodiments, as discussed herein, the disclosed framework can operate by enabling a user to leverage authentication with a first secure system to access other securely held systems. In some embodiments, upon a user accessing a first system, a user's device (e.g., smart ring) is provided a secure session token, which can be stored in association with the device (e.g., in storage on the device and/or in a network accessible repository). In some embodiments, the token is capable of being provided to other securely held systems while the device is determined to have maintained association with the user. For example, upon receiving the token, the token remains valid as long as the user's smart ring remains worn by the user (e.g., on the same finger and hand as was established upon receiving the token). Thus, this effectively acts as an "open" session for the user device, for which confirmation of the user's identity can be proactively provided when requesting access to such systems.

According to some embodiments, a method is disclosed for a DI-based computerized framework for automatically and dynamically managing the identity and authenticated activities of a user via a wearable device associated with the user. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for automatically and dynamically managing the identity and authenticated activities of a user via a wearable device associated with the user.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 3 illustrates an exemplary workflow according to some embodiments of the present disclosure;

DETAILED DESCRIPTION

Figure 1:
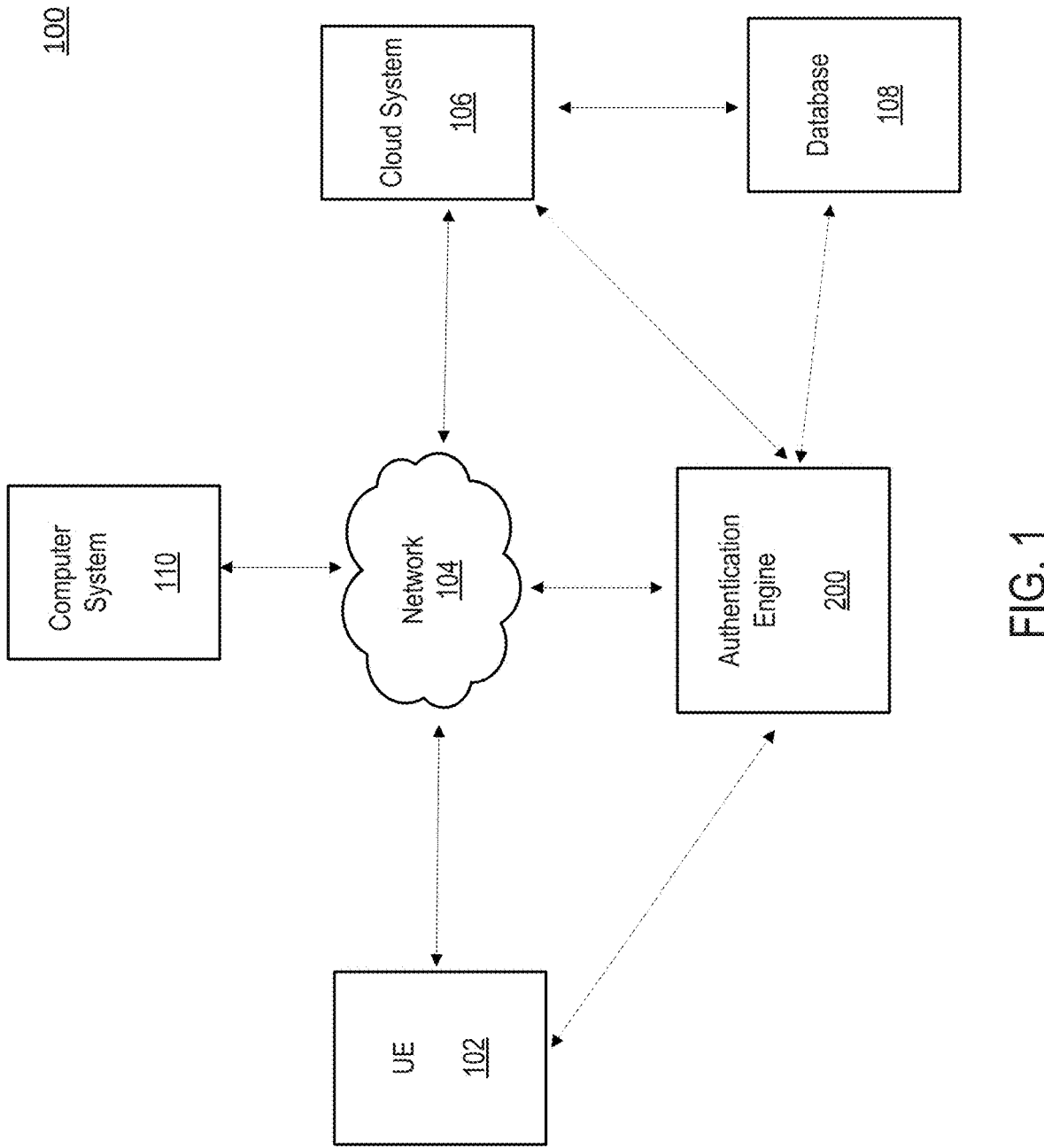
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, 4$^{th}$ or 5$^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. With reference to FIG. 1, system 100 is depicted which includes user equipment (UE) 102 (e.g., a client device, as mentioned above and discussed below in relation to FIG. 6), network 104, cloud system 106, database 108, computer system 110 and authentication engine 200. It should be understood that while system 100 is depicted as including such components, it should not be construed as limiting, as one of ordinary skill in the art would readily understand that varying numbers of UEs, cloud systems, databases, computer systems and/or networks can be utilized; however, for purposes of explanation, system 100 is discussed in relation to the example depiction in FIG. 1.

According to some embodiments, UE 102 can be any type of device, such as, but not limited to, a mobile phone, tablet, laptop, sensor, Internet of Things (IoT) device, autonomous machine, and any other device equipped with a cellular or wireless or wired transceiver. For example, UE 102 can be a smart ring, which as discussed below in more detail, can enable the identification and/or collection of vitals of the wearing user. In some embodiments, such vitals can correspond to, but not be limited to, heart rate, heart rate variability (HRV), blood oxygen levels, blood pressure, hydration temperature, pulse, motion, sleep, and/or any other type of biometric for a person, or some combination thereof.

In some embodiments, peripheral device (not shown) can be connected to UE 102, and can be any type of peripheral device, such as, but not limited to, a wearable device (e.g., smart ring or smart watch), printer, speaker, sensor, and the like. In some embodiments, peripheral device can be any type of device that is connectable to UE 102 via any type of known or to be known pairing mechanism, including, but not limited to, WiFi, Bluetooth™, Bluetooth Low Energy (BLE), NFC, and the like. For example, the peripheral device can be a smart ring that connectively pairs with UE 102, which can be a user's smart phone.

According to some embodiments, UE 102 can correspond to an access point (AP) device, which is a device that creates a wireless local area network (WLAN) for the location. According to some embodiments, an AP device can be, but is not limited to, a router, switch, hub and/or any other type of network hardware that can project a WiFi signal to a designated area. For example, an AP device can be a Plume Pod™, and the like. In some embodiments, UE 102 may be an AP device for which another smart device connects thereto.

According to some embodiments, computer system 110 can be any type of secure local and/or network device, location, application, account, portal, resource, and the like, upon which authentication is required for a device and/or user to access the securely held information. For example, computer system 100 can be, but is not limited to, a web-portal, website, application, account, datastore, repository, cloud, peer device, platform, exchange, and the like, or some combination thereof.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a smart home or network provider, which has associated network resources hosted on the internet or private network (e.g., network 104), which enables (via engine 200) the identity and authentication management discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102, and the services and applications provided by cloud system 106 and/or authentication engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 4:
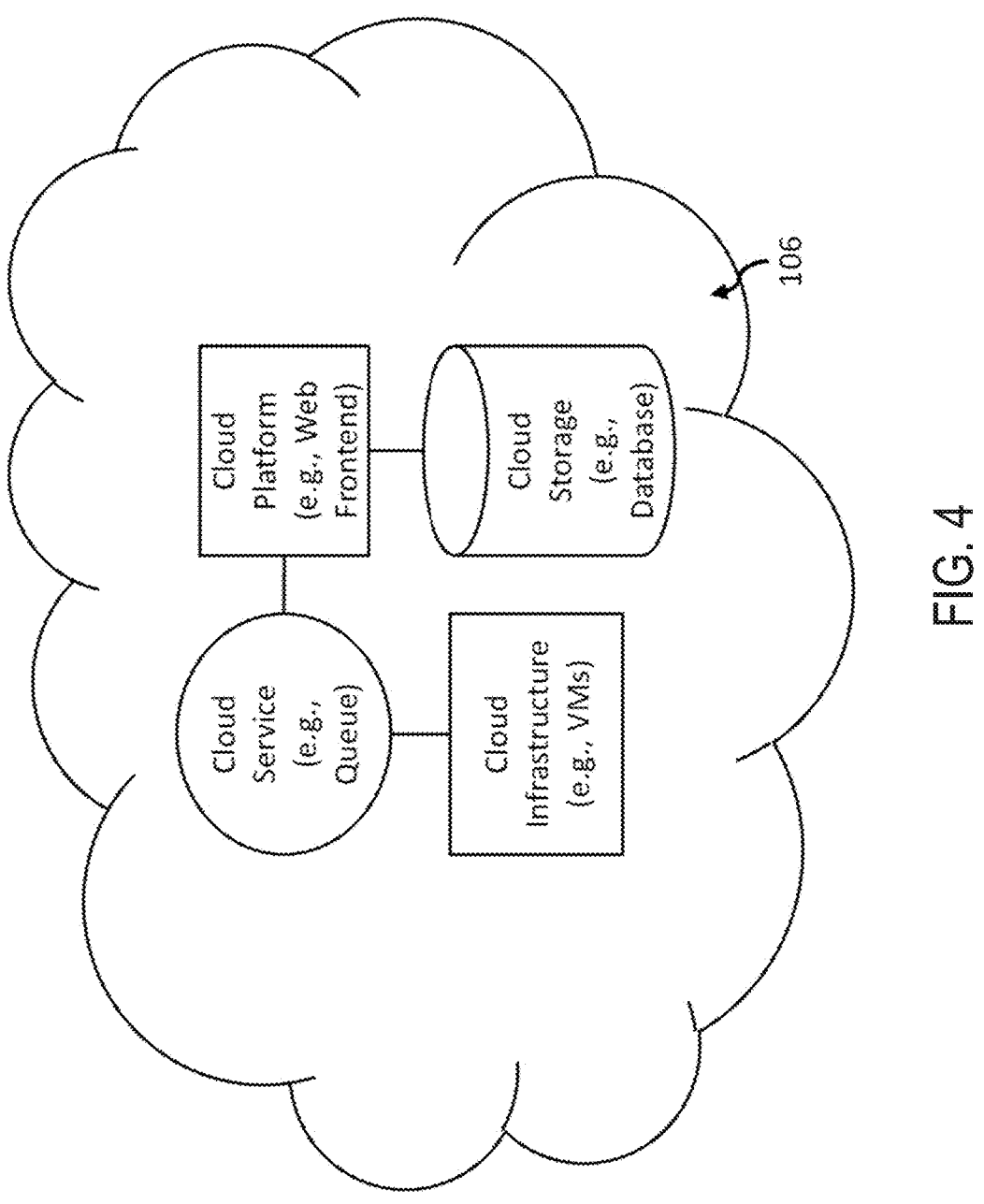
FIG. 4 depicts an exemplary implementation of an architecture according to some embodiments of the present disclosure.
Figure 5:
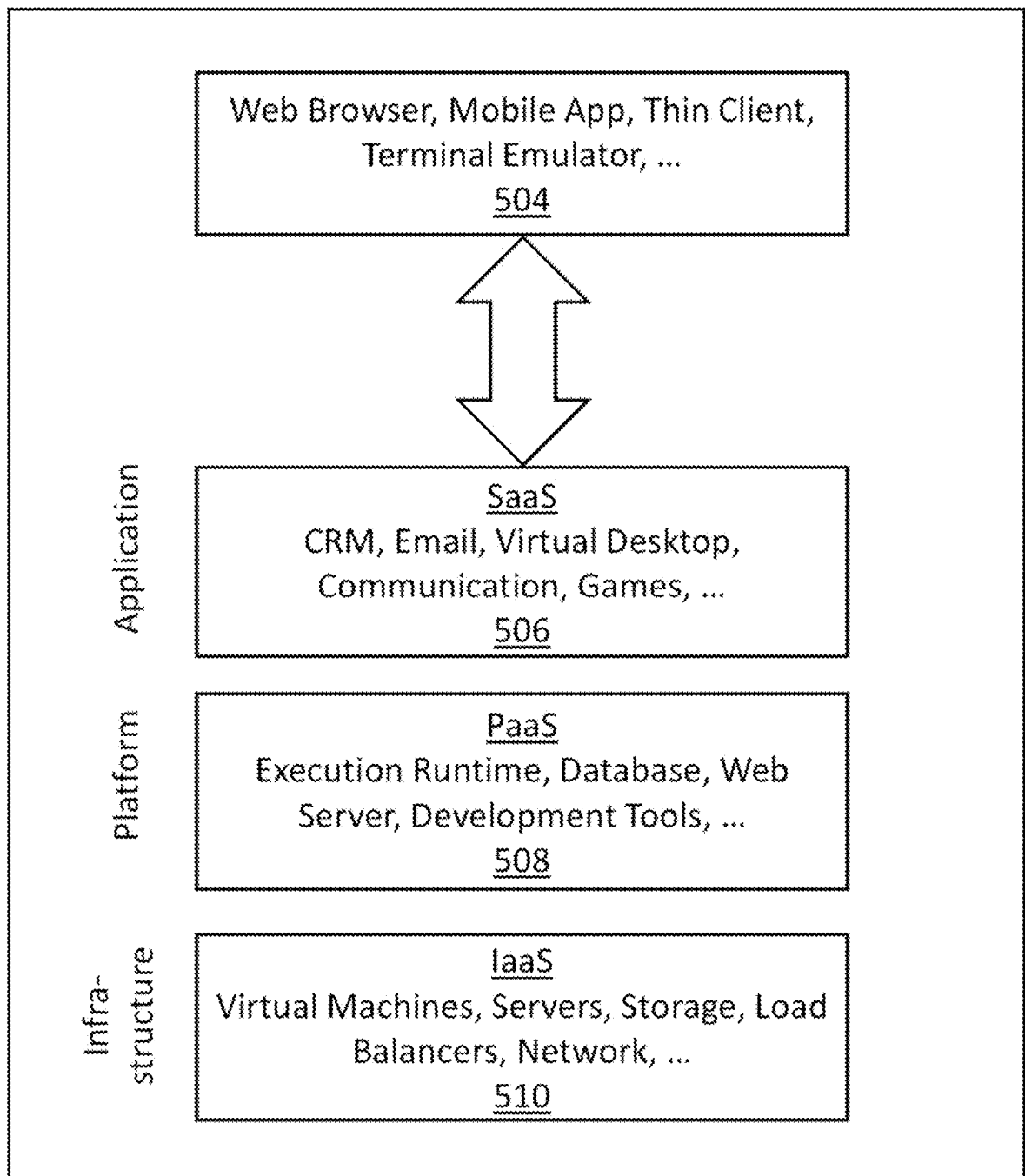
FIG. 5 depicts an exemplary implementation of an architecture according to some embodiments of the present disclosure.

Turning to FIGS. 4 and 5, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure as a service (IaaS) 510, platform as a service (PaaS) 508, and/or software as a service (SaaS) 506 using a web browser, mobile app, thin client, terminal emulator or other endpoint 504. FIGS. 4 and 5 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Authentication engine 200, as discussed above and further below in more detail, can include components for the disclosed functionality. According to some embodiments, authentication engine 200 may be a special purpose machine or processor, and can be hosted by a device on network 104, within cloud system 106 and/or on UE 102. In some embodiments, engine 200 may be hosted by a server and/or set of servers associated with cloud system 106.

According to some embodiments, as discussed in more detail below, authentication engine 200 may be configured to implement and/or control a plurality of services and/or microservices, where each of the plurality of services/microservices are configured to execute a plurality of workflows associated with performing the disclosed security management. Non-limiting embodiments of such workflows are provided below in relation to at least FIG. 3.

According to some embodiments, as discussed above, authentication engine 200 may function as an application provided by cloud system 106. In some embodiments, engine 200 may function as an application installed on a server(s), network location and/or other type of network resource associated with system 106. In some embodiments, engine 200 may function as an application installed and/or executing on UE 102. In some embodiments, such application may be a web-based application accessed by UE 102 and/or other devices over network 104 from cloud system 106. In some embodiments, engine 200 may be configured and/or installed as an augmenting script, program or application (e.g., a plug-in or extension) to another application or program provided by cloud system 106 and/or executing on UE 102.

Figure 2:
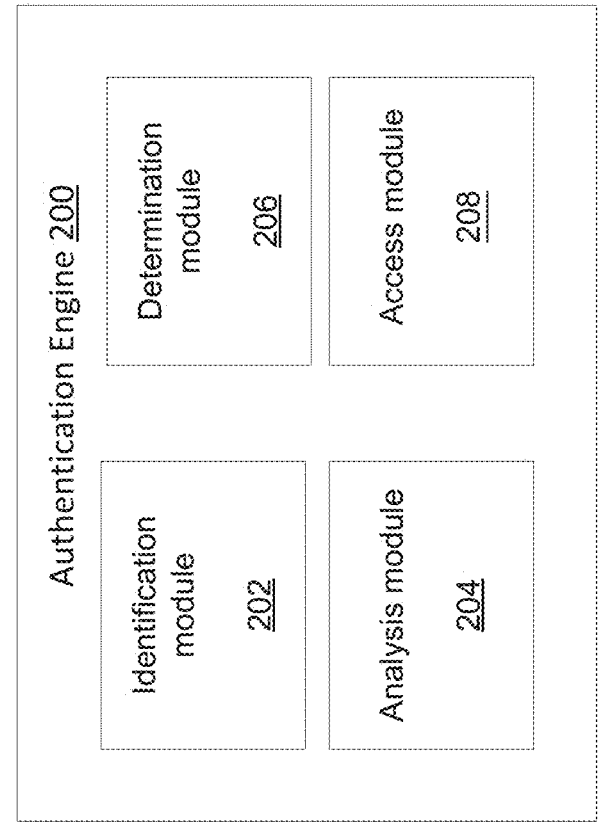
FIG. 2 is a block diagram illustrating components of an exemplary system according to some embodiments of the present disclosure.

As illustrated in FIG. 2, according to some embodiments, authentication engine 200 includes identification module 202, analysis module 204, determination module 206 and access module 208. It should be understood that the engine (s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Turning to FIG. 3, Process 300 provides non-limiting example embodiments for the disclosed security management framework. According to some embodiments, Process 300 provides non-limiting embodiments for a cross-session authentication framework that enables secure local and/or network sessions to be effectuated via biometric tracking via a wearable device (e.g., smart ring).

According to some embodiments, while the discussion herein may focus upon a smart ring being UE 102, for purposes of discussing Process 300, it should not be construed as limiting, as one of skill in the art would recognize that any type of wearable device that captures and monitors biometrics of a user can be implemented without departing from the scope of the instant disclosure.

According to some embodiments, Steps 302-304 and 314-318 can be performed by access module 208 of authentication engine 200; Steps 306-308 can be performed by identification module 202; Step 310 can be performed by analysis module 204; and Step 312 can be performed by determination module 206.

According to some embodiments, Process 300 begins with Step 302 where authentication for a first secure session with a first system is performed. According to some embodiments, as discussed above, the first secure session can correspond to a user logging into their account (or registering for an account, according to some embodiments) for any type of known or to be known computer system (e.g., computer system 110, cloud system 106, and the like). For example, in Step 302, engine 200 can provide login credentials to a first system that can verify the user's identity, thereby enabling the user (and the device the user is using) access to the first system. In some embodiments, for example, a user, via their smart phone, can login to an application running on their smart phone via providing a face identifier (ID).

In Step 304, in response to the authentication in Step 302, engine 200 can provide a session token to a user's UE. The session token can be utilized, as discussed herein, to initiate and/or maintain an authentication state. For example, as discussed above, the UE can be a smart ring; as such, in some embodiments, the smart ring can receive a session that includes information related to an identity of the user. In some embodiments, the session can correspond to information related to, but not limited to, a time period, type of activity, type of encryption, type of content, a type of UE, a location, and the like, or some combination thereof.

In some embodiments, the session token can be stored in memory of the UE (e.g., RAM of the smart ring). In some embodiments, the session token, which can be encrypted, can be stored in database 108, as depicted in relation to FIG. 1, for example, In some embodiments, the key can be subject to any type of symmetric and asymmetric encryption, which can be, but is not limited to, master key encryption (MEK), key encryption key (KEK), content encryption (CEK), and the like.

In Step 306, engine 200 can monitor and collect data associated with the physical contact of the UE with the user. For example, engine 200 can collect and track biometric data related to the smart ring on the user's finger, which can also indicate where on the user's finger the ring is located (upon the performance of Step 302), which finger, and which position/rotation/angle the ring is at such time proximate to Step 302. Accordingly, as discussed above, Step 306 can involve tracking whether the user is wearing the smart ring, whether and when they have removed it, and/or if the smart ring has been put back on the user's finger properly.

In some embodiments, Step 306 can involve the collection of data about the user (e.g., referred to as user data). According to some embodiments, the user data can be collected continuously and/or according to a predetermined period of time or interval. In some embodiments, user data may be collected based on detected events (e.g., the authentication of the first secure session, as discussed supra). As discussed above, the user data can provide biometrics or vitals for the user, which can include information related to, but are not limited to, heart rate, heart rate variation (HRV), blood oxygen levels, blood pressure, body temperature, hydration temperature, pulse, motion, and the like, or some combination thereof.

In some embodiments, the collected user data in Step 306 can be stored in database 108 in association with an ID of a user, an ID of the first secure session, ID of the location and/or an ID of an account of the user/location, and the like.

In Step 308, engine 200 can receive a request from the user to access a second secure system to establish a second secure session. Such request can include, but not limited to, traversing to another website or portal or network resource (different from the first system), attempting to login to another application or system, and the like, or some combination thereof.

For example, in Step 302, the user successfully logged into a first application on their smartphone, as discussed above. In Step 308, the user can open another application (e.g., a mail application, for example), for which the application can require identity verification before the user can access their mail account. In another non-limiting example, as discussed above respective to FIG. 1, the second secure system can be an IoT device, which can be accessible given the active session token.

In yet another example, the second secure system can be a third party system, such as, for example, a payment system and/or other type of system for which authentication to account credentials of the user can be provided via the session token's presence in association with the user's wearable device (e.g., the ring is maintained on the user's finger, for example).

Accordingly, in Step 310, based on the request (from Step 308), engine 200 can analyze the collected data (from Step 308). In some embodiments, the collected data analysis, as discussed above, can be directed to whether the user is still wearing the smart ring, whether the smart ring was removed but is now being worn again (e.g., at a time proximate or associated with a time of the second request of Step 308), if the ring is being worn improperly, and the like. As discussed herein, the session token (from Step 304) is tied to the user maintaining the smart ring being worn to ensure that, for example, another user has not put on the user's ring. Thus, the analysis of Step 310 can serve as a backstop to guaranteeing that the identity of the user requesting access to the second system corresponds to the same user that was authenticated in Step 302.

For example, Step 310 can involve checking whether the person is still wearing their ring. For example, in the event of a robbery, the person can remove the ring thereby disabling access to their linked accounts.

According to some embodiments, engine 200 can implement any type of known or to be known computational analysis technique, algorithm, mechanism or technology to analyze the collected user data from Step 306.

In some embodiments, engine 200 may include a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:
- a. define Neural Network architecture/model,
- b. transfer the input data to the neural network model,
- c. train the model incrementally,
- d. determine the accuracy for a specific number of timesteps,
- e. apply the trained model to process the newly-received input data,
- f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

In Step 312, based on the analysis from Step 308, engine 200 can determine whether to authenticate the user (e.g., reply with an "auth" or "no_auth" message). According to some embodiments, the determination can leverage the information for the request from the second system in correlation with the biometrics data to determine that i) the smart ring is still being properly worn by the user (from Step 302), ii) was removed, but was put back on before the request for the second system, or iii) was not being worn at the time of the second request.

In some embodiments, should the smart ring have been removed between Steps 302 and 308 (e.g., despite it being put back on before the request of Step 308), engine 200 may require a new session token, as upon removal of the ring, and an absence (for at least a predetermined period of time) of collected biometric data, may cause the session token (from Step 304) to be rendered invalid (and in some embodiments, removed from storage). Thus, in some embodiments, if the session token is rendered invalid, Step 308 may function in a similar manner as Step 302 where a new session can be created for subsequent system access operations.

Accordingly, when the user is not authenticated for automatic access to the second system (e.g., the session token is not valid because the smart ring is not currently being worn at the time of the second request or it had been removed prior to the performance of Step 308), Process 300 can proceed from Step 312 to Step 314. In Step 314, the authentication request is denied, and a notification can be communicated to a device of the user (e.g., no_auth message).

In some embodiments, the notification can be sent to one or more devices of the user. For example, if the user requested access on their smart phone, a notification can be displayed on the smart phone indicating the denial of access, which can include an option to login via other procedures. In some embodiments, a notification can also or alternatively be sent to the smart ring of the user, which can provide a haptic or audible output indicating the denial.

Accordingly, any type of known or to be known notification can be utilized, which include, but is not limited to, audio, video, text, haptic and the like, output effects that can alert the user to a denial of an access request.

In some embodiments, when the user is authenticated to access the second system (e.g., the smart ring is currently being worn at the time of the second request), Process 300 can proceed from Step 312 to Step 316. In Step 316, the session token (from Step 304) can be provided to the second system, which functions as a confirmation of the identity of the user requesting access to the second system. In some embodiments, the session token can be updated to include information related to and/or reference a secure session with the second system.

In some embodiments, Step 316 can involve the device of the user communicating an "auth" message to the second system (e.g., without communicating the session token). Such message can provide an indication that access is granted via the device of the user. In some embodiments, such message can include, but is not limited to, credentials that enable the second session to be access via approved credentials associated with the user and/or device.

Thus, in Step 318, the provided session token (and/or auth message, in some embodiments, as discussed above) can enable the establishment of a secure second session for the user which enables them to access the electronic resources and information hosted by the second system.

Accordingly, after Step 314 and/or Step 318, engine 200 may then continue monitoring the user. In some embodiments, the monitoring can continue running in the backend, while certain modules of engine 200 execute to optimize authentication of the user's identity, as discussed above.

By way of a non-limiting example, a user requests access to a first application on their laptop. As in Step 302, the user enters their username/password, then via 2FA, enters the code from their smartphone SMS application, and is authenticated for the first application. As in Step 304, a session token is transmitted to the user's smart ring which provides validated identity information for the user.

The user then, on their smart phone, opens a second application, and requests access. As discussed above, since the user is determined to have not removed their smart ring from the time of accessing the first application (or removed it, but then put it on prior to requesting access to the second application), the user is granted access to the second application. Such access is facilitated via the session token and/or auth message being provided to the second application as a form of identity verification.

Thus, as discussed above, the disclosed systems and methods can provide a cross-application, cross-session and cross-device authentication system that enables users to login and establish secure computer sessions based on security identification information stored and provided from the user's smart ring, which is based on and tied to continued biometric readings ensuring the ring maintains it correlation with the proper wearer.

According to some embodiments, a user and/or location can have a dedicated engine 200 model so that the authentication protocols discussed herein can be specific to the events and patterns learned and detected for the user and/or at that location. In some embodiments, the model can be specific for a user or set of users (e.g., users that live at a certain location (e.g., a house). For example, parental controls can be provided via a parent's valid session token (e.g., a child's request for content can be contingent upon the parent's smart ring being actively worn for a parent-session).

Figure 6:
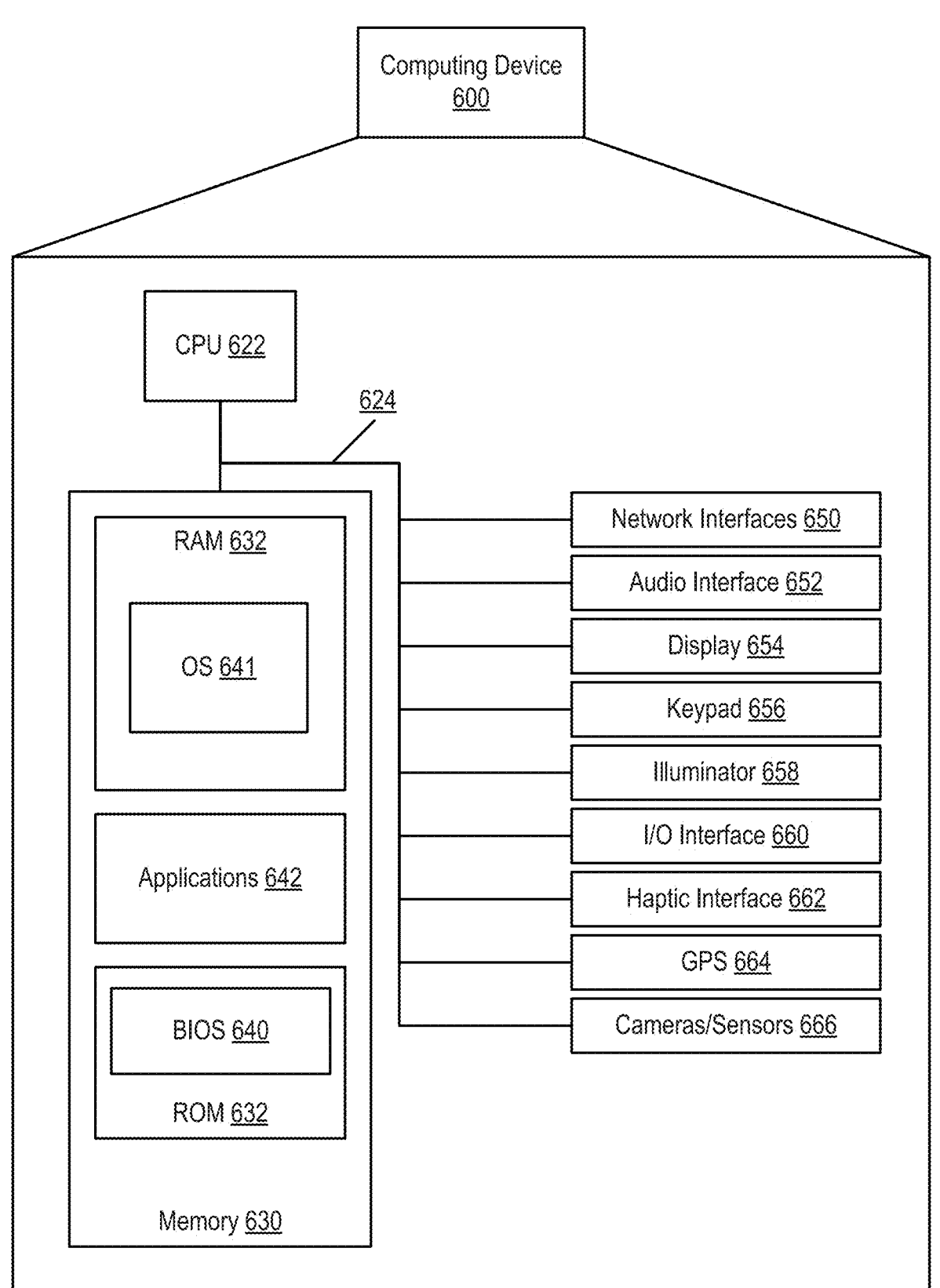
FIG. 6 is a block diagram illustrating a computing device showing an example of a client or server device used in various embodiments of the present disclosure.

FIG. 6 is a schematic diagram illustrating a client device showing an example embodiment of a client device that may be used within the present disclosure. Client device 600 may include many more or less components than those shown in FIG. 6. However, the components shown are sufficient to disclose an illustrative embodiment for implementing the present disclosure. Client device 600 may represent, for example, UE 102 discussed above at least in relation to FIG. 1.

As shown in the figure, in some embodiments, Client device 600 includes a processing unit (CPU) 622 in communication with a mass memory 630 via a bus 624. Client device 600 also includes a power supply 626, one or more network interfaces 650, an audio interface 652, a display 654, a keypad 656, an illuminator 658, an input/output interface 660, a haptic interface 662, an optional global positioning systems (GPS) receiver 664 and a camera(s) or other optical, thermal or electromagnetic sensors 666. Device 600 can include one camera/sensor 666, or a plurality of cameras/sensors 666, as understood by those of skill in the art. Power supply 626 provides power to Client device 600.

Client device 600 may optionally communicate with a base station (not shown), or directly with another computing device. In some embodiments, network interface 650 is sometimes known as a transceiver, transceiving device, or network interface card (NIC).

Audio interface 652 is arranged to produce and receive audio signals such as the sound of a human voice in some embodiments. Display 654 may be a liquid crystal display (LCD), gas plasma, light emitting diode (LED), or any other type of display used with a computing device. Display 654 may also include a touch sensitive screen arranged to receive input from an object such as a stylus or a digit from a human hand.

Keypad 656 may include any input device arranged to receive input from a user. Illuminator 658 may provide a status indication and/or provide light.

Client device 600 also includes input/output interface 660 for communicating with external. Input/output interface 660 can utilize one or more communication technologies, such as USB, infrared, Bluetooth™, or the like in some embodiments. Haptic interface 662 is arranged to provide tactile feedback to a user of the client device.

Optional GPS transceiver 664 can determine the physical coordinates of Client device 600 on the surface of the Earth, which typically outputs a location as latitude and longitude values. GPS transceiver 664 can also employ other geopositioning mechanisms, including, but not limited to, triangulation, assisted GPS (AGPS), E-OTD, CI, SAI, ETA, BSS or the like, to further determine the physical location of client device 600 on the surface of the Earth. In one embodiment, however, Client device may through other components, provide other information that may be employed to determine a physical location of the device, including for example, a MAC address, Internet Protocol (IP) address, or the like.

Mass memory 630 includes a RAM 632, a ROM 634, and other storage means. Mass memory 630 illustrates another example of computer storage media for storage of information such as computer readable instructions, data structures, program modules or other data. Mass memory 630 stores a basic input/output system ("BIOS") 640 for controlling low-level operation of Client device 600. The mass memory also stores an operating system 641 for controlling the operation of Client device 600.

Memory 630 further includes one or more data stores, which can be utilized by Client device 600 to store, among other things, applications 642 and/or other information or data. For example, data stores may be employed to store information that describes various capabilities of Client device 600. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 600.

Applications 642 may include computer executable instructions which, when executed by Client device 600, transmit, receive, and/or otherwise process audio, video, images, and enable telecommunication with a server and/or another user of another client device. Applications 642 may further include a client that is configured to send, to receive, and/or to otherwise process gaming, goods/services and/or other forms of data, messages and content hosted and provided by the platform associated with engine 200 and its affiliates.

According to some embodiments, certain aspects of the instant disclosure can be embodied via functionality discussed herein, as disclosed supra. According to some embodiments, some non-limiting aspects can include, but are not limited to the below method aspects, which can additionally be embodied as system, apparatus and/or device functionality:

Aspect 1. A method comprising:
   providing a session token to a device of a user, the session token corresponding to an authenticated session of the user with a first system;
   collecting biometric data related to the user, the biometric data providing an indication of a manner in which the user is wearing the device;
   communicating a request for access to a second system;
   analyzing the collected biometric data based on the request;
   determining, based on the analysis, whether to authenticate the user for the second system;
   electronically communicating information to the device based on the determination.

Aspect 2. The method of Aspect 1, wherein the communicated information comprises an indication of an access denial.

Aspect 3. The method of Aspect 2, further comprising:
   determining, based on the analysis, that the manner in which the user is wearing the device is not consistent with a manner corresponding to the authentication of the session with the first system.

Aspect 4. The method of Aspect 1, further comprising:
   determining, based on the analysis, that the manner in which the user is wearing the device is consistent with a manner corresponding to the authentication of the session with the first system; and
   communicating, via the device, the session token to the second system.

Aspect 5. The method of Aspect 4, further comprising:
   authenticating the user on the second system via the communicated session token.

Aspect 6. The method of Aspect 4, wherein the communicated information comprises an indication of access to the second system.

Aspect 7. The method of Aspect 1, further comprising:
   monitoring, via the device, the biometric data; and
   analyzing the biometric data to determine events corresponding to manners in which the user maintains a status of wearing the device, wherein the monitoring and analysis of the biometric data is based on the collection of the biometric data.

Aspect 8. The method of Aspect 1, further comprising:
   providing login credentials to the first system;
   receiving, in response to the provided login credentials, an indication of authentication with the first system, the authentication comprising access to an account with the first system; and
   communicating the session token to the device.

Aspect 9. The method of Aspect 1, wherein the session token is stored in association with the device.

Aspect 10. The method of Aspect 1, wherein the device is a smart ring.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

providing a session token to a device of a user, the session token corresponding to an authenticated session of the user with a first system, the session token stored in association with the device and configured to provide authentication credentials for accessing a plurality of systems;

collecting biometric data related to the user, the biometric data comprising data captured by one or more sensors of the device and providing an indication of a status of the user, the status indicating whether the user maintains an authenticated relationship with the device;

receiving a request for access to a second system, the second system being a distinct system from the first system and requiring separate authentication;

analyzing the collected biometric data based on the request, the analyzing comprising evaluating whether the biometric data is consistent with continued presence of an authenticated user with the device;

determining, based on the analysis, whether to authenticate the user for the second system, the determination comprising:

comparing the collected biometric data against reference biometric data associated with the authenticated session to identify whether the user associated with the session token remains the current user of the device; and granting authentication when the comparison indicates continuity of the authenticated user; and electronically communicating the session token to the second system along with information to the device based on the determination, the communicated session token enabling the second system to grant access without requiring the user to provide additional authentication credentials.

2. The method of claim 1, wherein the communicated information comprises an indication of an access denial.

3. The method of claim 2, further comprising:

determining, based on the analysis, that the status is not consistent with a manner corresponding to the authentication of the session with the first system.

4. The method of claim 1, further comprising:

determining, based on the analysis, that the status is consistent with a manner corresponding to the authentication of the session with the first system; and communicating, via the device, the session token to the second system.

5. The method of claim 4, further comprising:

authenticating the user on the second system via the communicated session token.

6. The method of claim 4, wherein the communicated information comprises an indication of access to the second system.

7. The method of claim 1, further comprising:

monitoring, via the device, the biometric data; and analyzing the biometric data to determine events corresponding to manners in which the user maintains the status, wherein the monitoring and analysis of the biometric data is based on the collection of the biometric data.

8. The method of claim 1, further comprising:

providing login credentials to the first system;

receiving, in response to the provided login credentials, an indication of authentication with the first system, the authentication comprising access to an account with the first system; and communicating the session token to the device.

9. The method of claim 1, wherein the session token is stored in association with the device.

10. The method of claim 1, wherein the device is a user device.

11. A system comprising:

a processor configured to:

provide a session token to a device of a user, the session token corresponding to an authenticated session of the user with a first system, the session token stored in association with the device and configured to provide authentication credentials for accessing a plurality of systems;

collect biometric data related to the user, the biometric data comprising data captured by one or more sensors of the device and providing an indication of a status of the user, the status indicating whether the user maintains an authenticated relationship with the device;

receive a request for access to a second system, the second system being a distinct system from the first system and requiring separate authentication;

analyze the collected biometric data based on the request, the analyzing comprising evaluating whether the biometric data is consistent with continued presence of an authenticated user with the device;

determine, based on the analysis, whether to authenticate the user for the second system by:

comparing the collected biometric data against reference biometric data associated with the authenticated session to identify whether the user associated with the session token remains the current user of the device; and granting authentication when the comparison indicates continuity of the authenticated user; and electronically communicate the session token to the second system along with information to the device based on the determination, the communicated session token enabling the second system to grant access without requiring the user to provide additional authentication credentials.

12. The system of claim 11, wherein the processor is further configured to:

determine, based on the analysis, that the status is not consistent with a manner corresponding to the authentication of the session with the first system, wherein the communicated information comprises an indication of an access denial.

13. The system of claim 11, wherein the processor is further configured to:

determine, based on the analysis, that the status is consistent with a manner corresponding to the authentication of the session with the first system;

communicate the session token to the second system;

authenticate the user on the second system via the communicated session token, wherein the communicated information comprises an indication of access to the second system.

14. The system of claim 11, wherein the processor is further configured to:

monitor the biometric data; and analyze the biometric data to determine events corresponding to manners in which the user maintains the status, wherein the monitoring and analysis of the biometric data is based on the collection of the biometric data.

15. The system of claim 11, wherein the device is a user device.

16. A non-transitory computer-readable storage medium tangibly encoded with computer-executable instructions that when executed by a processor, perform a method comprising:

providing a session token to a device of a user, the session token corresponding to an authenticated session of the user with a first system, the session token stored in association with the device and configured to provide authentication credentials for accessing a plurality of systems;

collecting biometric data related to the user, the biometric data comprising data captured by one or more sensors of the device and providing an indication of a status of the user, the status indicating whether the user maintains an authenticated relationship with the device;

receiving a request for access to a second system, the second system being a distinct system from the first system and requiring separate authentication;

analyzing the collected biometric data based on the request, the analyzing comprising evaluating whether the biometric data is consistent with continued presence of an authenticated user with the device;

determining, based on the analysis, whether to authenticate the user for the second system, the determination comprising:

comparing the collected biometric data against reference biometric data associated with the authenticated session to identify whether the user associated with the session token remains the current user of the device; and granting authentication when the comparison indicates continuity of the authenticated user; and electronically communicating the session token to the second system along with information to the device based on the determination, the communicated session token enabling the second system to grant access without requiring the user to provide additional authentication credentials.

17. The non-transitory computer-readable storage medium of claim 16, further comprising:

determining, based on the analysis, that the status is not consistent with a manner corresponding to the authentication of the session with the first system, wherein the communicated information comprises an indication of an access denial.

18. The non-transitory computer-readable storage medium of claim 16, further comprising:

determining, based on the analysis, that the status is consistent with a manner corresponding to the authentication of the session with the first system;

communicating the session token to the second system;

authenticating the user on the second system via the communicated session token, wherein the communicated information comprises an indication of access to the second system.

19. The non-transitory computer-readable storage medium of claim 16, further comprising:

monitoring the biometric data; and analyzing the biometric data to determine events corresponding to manners in which the user maintains the status, wherein the monitoring and analysis of the biometric data is based on the collection of the biometric data.

20. The non-transitory computer-readable storage medium of claim 16, wherein the device is a user device.

* * * * *